United States Patent
Harmon et al.

(10) Patent No.: US 8,813,933 B2
(45) Date of Patent: Aug. 26, 2014

(54) CAST-IN SPLINE SLEEVE FOR CLUTCH HUB

(75) Inventors: Caleb G. Harmon, Hartland, MI (US); Scott William Heitzenrater, Orion, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 231 days.

(21) Appl. No.: 13/041,737

(22) Filed: Mar. 7, 2011

(65) Prior Publication Data

US 2012/0061203 A1 Mar. 15, 2012

Related U.S. Application Data

(60) Provisional application No. 61/383,231, filed on Sep. 15, 2010.

(51) Int. Cl.
 *F16D 13/68* (2006.01)
 *F16D 13/64* (2006.01)

(52) U.S. Cl.
 CPC ............ *F16D 13/644* (2013.01); *F16D 13/683* (2013.01); *F16D 13/68* (2013.01)
 USPC ...................................... 192/70.2; 192/70.16

(58) Field of Classification Search
 CPC ....... F16D 13/38; F16D 13/683; F16D 13/52; F16D 13/644
 USPC ....................................................... 192/70.2
 See application file for complete search history.

(56) References Cited

U.S. PATENT DOCUMENTS 7,191,883 B2 * 3/2007 Angermaier ............... 192/58.61
7,278,525 B2 10/2007 Portell et al.

FOREIGN PATENT DOCUMENTS

| DE | 8433502 | U1 | 3/1986 |
| DE | G8433502.5 | U1 | 3/1986 |
| DE | 10260488 | A1 | 7/2004 |
| DE | 102005047305 | A1 | 4/2007 |
| DE | 102007014352 | A1 | 10/2008 |
| JP | 361185047 | A * | 8/1986 |
| JP | 409264337 | A * | 10/1997 |
| JP | 11125323 | A * | 5/1999 |

OTHER PUBLICATIONS

K.H. Choe, K.S. Park, B.H. Kang, G.S. Cho, K.Y. Kim, K.W. Lee, M.H. Kim, A.Ikenaga, and S.Koroyasu; Study of the interface between Steel Insert and Aluminum Casting in EPC; J.Mater.Sci. Technol., vol. 24, No. 1, 2008.*

* cited by examiner

*Primary Examiner* — Stefanos Karmis
*Assistant Examiner* — Colby M Hansen

(57) ABSTRACT

A composite, i.e., two element, two material clutch hub includes an inner sleeve of a heavy, high strength material to and about which is cast an outer element of a lighter, lower strength material. The sleeve typically includes a splined opening that is received on one or two complementarily splined shafts and a plurality of radially oriented pins or lugs or a discontinuous flange about which the outer element is cast. The outer element is splined to the friction plate of a clutch or other component. The high strength material is preferably, though not necessarily, steel and the lighter material is preferably, though not necessarily, an aluminum alloy. Alternatively, the sleeve may be a high strength aluminum alloy such as a metal matrix composite (MMC) and the outer element may be a lower strength, different aluminum alloy.

18 Claims, 2 Drawing Sheets

CAST-IN SPLINE SLEEVE FOR CLUTCH HUB

CROSS REFERENCE TO RELATED APPLICATION

This patent application claims the benefit of U.S. Provisional Patent Application Ser. No. 61/383,231, filed Sep. 15, 2010, which is hereby incorporated in its entirety herein by reference.

FIELD

The present disclosure relates to a two component clutch hub and more particularly to a composite clutch hub or housing having an inner sleeve of a heavy, high strength material to and about which an outer element of a lighter, lower strength material is cast.

BACKGROUND

The statements in this section merely provide background information related to the present disclosure and may or may not constitute prior art.

Many relatively large rotating components in power trains and drive lines include an inner, smaller diameter element or portion that is subjected to high torques and stresses and an outer, larger diameter element or portion that is subjected to lower torques and stresses. While this situation was long ago acknowledged, the manufacturing response to it was to simply fabricate the part from one material for reasons of simplicity of manufacture. Depending upon the sophistication of the manufacturing process, for example, stamping or casting, the material might be made thinner in the outer, larger diameter region.

As weight and material savings became increasingly important as engineering design criteria, more attention was paid to this situation. One solution was to manufacture the inner, smaller diameter component of a relatively strong, heavy and high strength material such as steel while manufacturing the outer, larger diameter component of a relatively lighter and less strong material such as aluminum. While from strength and weight considerations, this approach represented an improvement over prior art configurations, it created the additional problem of how to connect or secure the two components together.

Several attachment schemes were developed. A first involved riveting or bolting the two components together. This, of course, involved not only additional components and an assembly process but also necessitated accurate control of the assembly process. A second approach involved a serrated press fit between the components. This required that the components include additional material adjacent the press fit connection to support and withstand the press fit loads. Additional material was also necessary around the connection to ensure proper piloting of one component on the other during the press fit assembly.

A steel—aluminum weld at the connection has also been suggested. First of all, this approach requires additional material adjacent the connection to withstand and disperse weld heat. Additionally, the application of sufficient heat to weld the steel without melting or causing deterioration of the aluminum represents a significant process challenge. Finally, a castle joint has been proposed but this typically results in a small amount of end-play requiring additional material at the connection for the castle teeth and to ensure proper piloting during assembly.

In view of the foregoing, it is apparent that improvements in the means and method of assembling power train and drive line components having inner and outer elements are desirable.

SUMMARY

The present invention provides a composite, i.e., two component, two material clutch hub or housing having an inner sleeve of a heavy, high strength material to and about which an outer element or bell of a lighter, lower strength material is cast. The sleeve typically includes a splined opening that is received on one or two complementarily splined shafts and a plurality of radially oriented fingers or lugs or a discontinuous flange about which the outer element or bell is cast. The outer element or bell is splined to the friction plates of a clutch or other component. The high strength material is preferably, though not necessarily, steel and the lighter material is preferably, though not necessarily, an aluminum alloy. Alternatively, the sleeve may be a high strength aluminum alloy such as a metal matrix composite (MMC) and the outer element or bell may be a lower strength, different aluminum alloy.

The two component clutch hub of the present invention provides reduced weight, mass and moment of inertia and improved performance by locating the higher strength, higher weight material in the Inner region of higher stress and higher torque and locating the lower weight, lower strength material in the outer region of lower stress and lower torque. Moreover, the invention provides an improved, positive method and means of assembling the two components.

It will be appreciated that although the invention is described in association with a clutch assembly and transmission, the invention has numerous applications and its attendant benefits may be enjoyed when utilized with a wide variety of power train and drive line components, both vehicular and non-vehicular.

Thus it is an aspect of the present invention to provide a clutch hub or housing fabricated of two distinct materials.

It is a further aspect of the present invention to provide a clutch hub having an inner sleeve fabricated of a higher strength material and an outer element or bell of a lower strength material cast about the inner sleeve.

It is a still further aspect of the present invention to provide a clutch hub having an inner sleeve fabricated of a heavier material and an outer element or bell of a lighter material cast about the inner sleeve.

It is a further aspect of the present invention to provide a clutch hub having an inner sleeve fabricated of a heavier, higher strength material and an outer element or bell of a lighter, lower strength material cast about the inner sleeve.

It is a further aspect of the present invention to provide a clutch hub having an inner sleeve defining a splined opening.

It is a further aspect of the present invention to provide a clutch hub having an outer element or bell having splines adapted to engage plates of a friction clutch.

It is a further aspect of the present invention to provide a clutch hub having an inner sleeve fabricated of steel or a similar relatively high strength material and an outer element or bell fabricated of aluminum or a similar lighter, lower strength material which is cast about the inner sleeve.

It is a further aspect of the present invention to provide a drive line component having an inner element fabricated of a higher strength material and an outer element of a lower strength material cast about the inner element.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
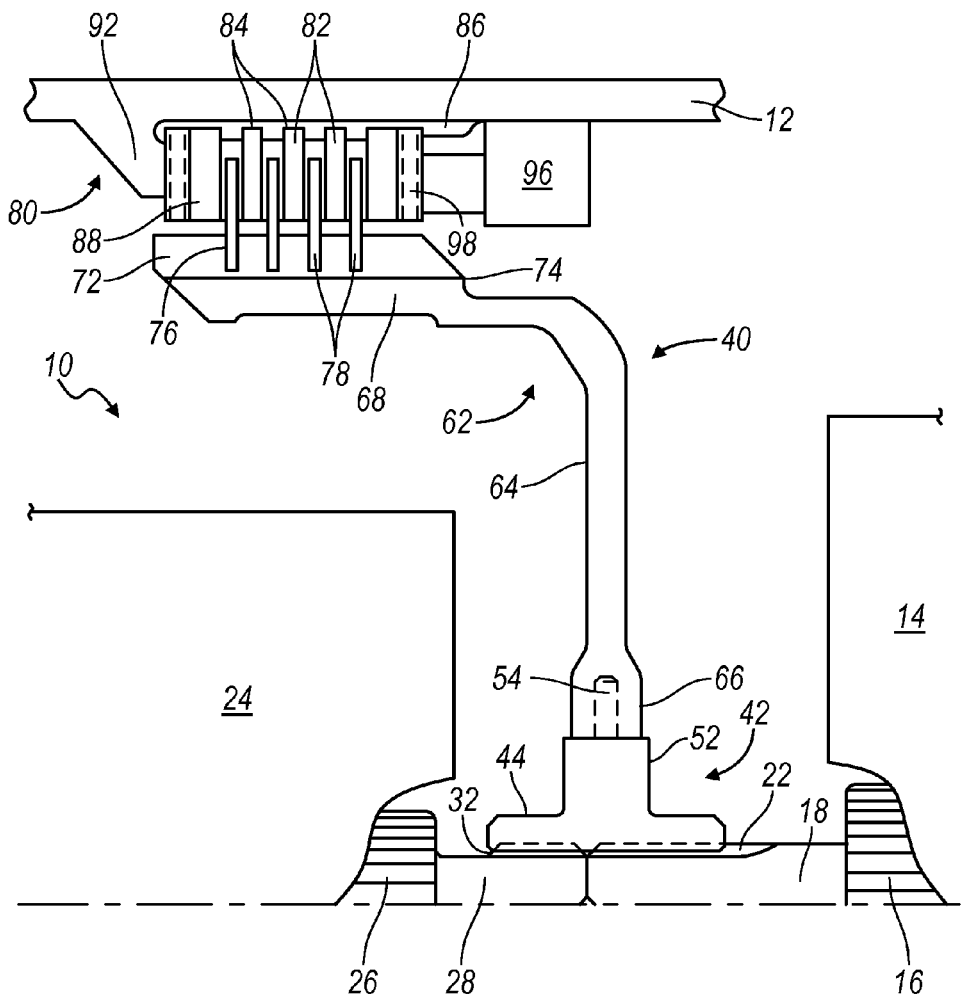
FIG. 1 is a schematic, sectional view of a clutch hub according to the present invention and associated components within a transmission.

With reference to FIG. 1, a portion of an automatic motor vehicle transmission incorporating the present invention is illustrated and designated by the reference number 10. The automatic transmission 10 includes a typically cast, metal housing 12 having various openings, flanges, ports, shoulders and the like (not illustrated) which receive, locate, support and protect the internal components of the automatic transmission 10. Among those internal components are a first planetary gear assembly 14 having a first sun gear 16 which is secured to a first stub shaft 18 having a first male or external spline set 22. The automatic transmission 10 also includes a second planetary gear assembly 24 having a second sun gear 26 which is secured to a second stub shaft 28 having a second male or external spline set 32. The first and second planetary gear assemblies 14 and 24 are conventional and include, in addition to the sun gears 16 and 26, respective planet gear carriers, pluralities of planet gears and ring gears (all not illustrated).

Figure 2:
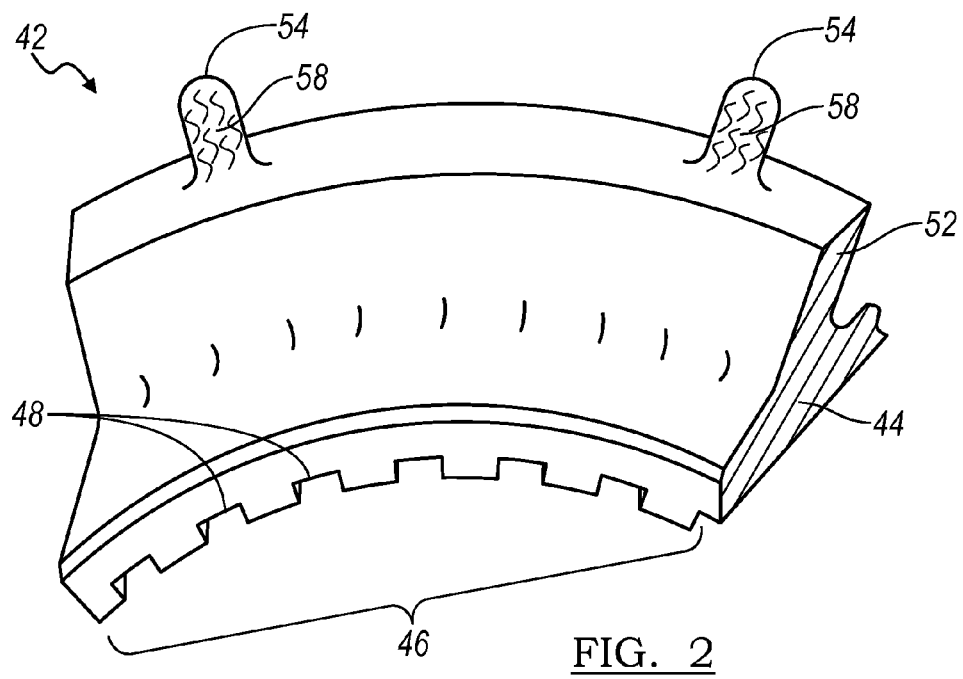
FIG. 2 is an enlarged, fragmentary view of a clutch sleeve according to the present invention.

Referring now to FIGS. 1 and 2, a clutch hub 40 according to the present invention couples and engages the first and the second spline sets 22 and 32 on the first and the second shafts 18 and 28, respectively. The clutch hub 40 is a two component assembly and includes an inner sleeve 42 having a cylindrical body 44 defining a through axial opening 46 bounded by or defining an internal or female spline set 48 that is complementary to the male spline sets 22 and 32 on the stub shafts 18 and 28. The inner sleeve 42 also includes an integral annulus 52 that surrounds the cylindrical body 44, preferably at its axial mid-point. A plurality of radial fingers or lugs 54 extend from the outer edge of the annulus 52. It has been determined that between eight and twelve equally circumferentially spaced fingers or lugs 54 are sufficient and appropriate although the actual number utilized may be more or fewer depending upon the size of the fingers or lugs 54, the size (diameter) of the inner sleeve 42, its torque load and other engineering and design variables.

Cast in place upon the inner sleeve 42 after it has been fabricated is an outer element 62. The outer element 62 may be bell (or "L") shaped in cross section as illustrated in FIG. 1 or it may be, for example, T-shaped, or any other shape or configuration dictated by the transmission or drive line components with which it is associated and their packaging. The outer element 62 is cast in place and includes a radially extending thinner portion 64 having an inner increased thickness region or yoke 66 which engages and receives the fingers or lugs 54 of the inner sleeve 42.

As illustrated in FIG. 2, preferably though not necessarily, the fingers or lugs 54 have exterior surfaces 58 which are distressed, upset or irregular which improves the bond between them and the outer element 62.

Returning to FIG. 1, the outer element 62 also includes an axially extending portion 68 defining male or external splines 72 on its outer surface 74. The male or external splines 72 are complementary to and engage female or internal splines 76 on a plurality of spaced apart first or smaller friction plates or discs 78 which form a portion of a friction clutch pack assembly 80. Interleaved with the plurality of first friction plates or discs 78 are a plurality of second or larger friction plates or discs 82 that include male or external splines 84 which engage complementary stationary female or internal splines 86. The stationary female or internal splines 86 may be an integral component of the housing 12 or be a portion of an assembly that is attached or secured thereto.

The friction clutch pack assembly 80 also includes reaction members 88 and a stop 92 which may be either a portion of the housing 12 or may be a snap ring or similar component (not illustrated) installed in the housing 12. A hydraulic or electric actuator 96 acts upon the friction clutch pack assembly 80 through an apply plate assembly 98 to compress the plates or discs 78 and 82 and to selectively transfer torque from the stub shafts 18 and 28, through the clutch hub 40 and to the housing 12.

Figure 3:
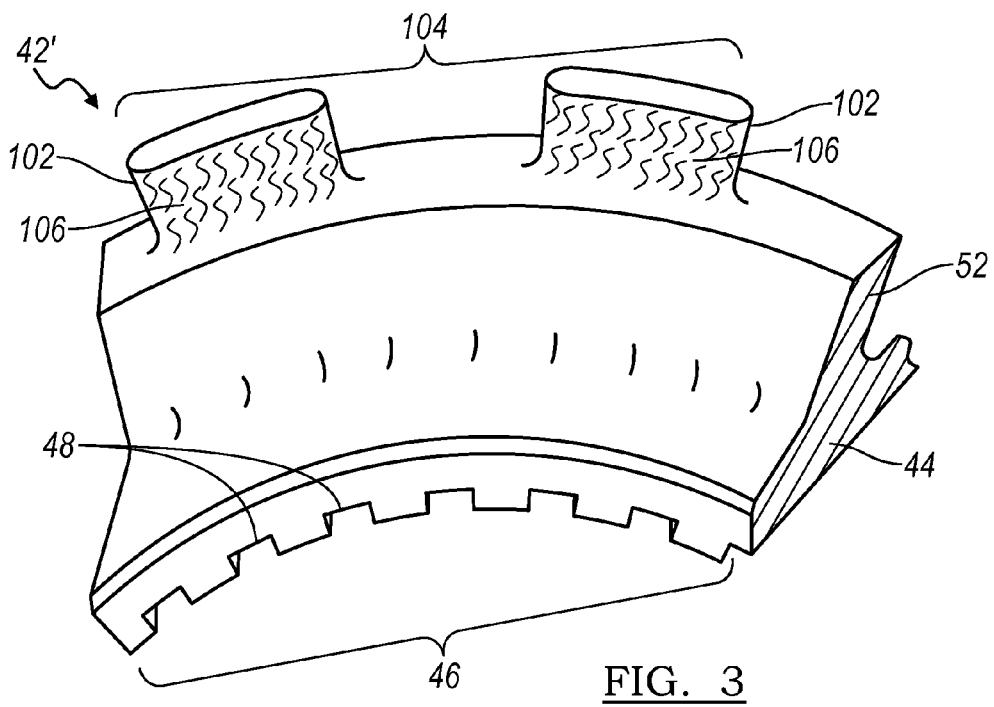
FIG. 3 is an enlarged, fragmentary view of an alternate configuration of a clutch sleeve according to the present invention.

Referring now to FIG. 3, an alternate configuration of the fingers or lugs 54 of an inner sleeve 42' is illustrated. The alternate configuration takes the form of a plurality of circumferentially spaced apart fins or webs 102 which create or form a discontinuous flange 104. Once again, the surfaces 106 of the fins or webs 102 may be distressed, upset or irregular to improve the bond between them and the cast outer element 62.

The materials utilized in the inner sleeves 42 and 42' as well as in the outer element 62 may be varied but conform generally to the guideline that the heavier, stronger material, typically a metal, forms the inner sleeve 42 while a lighter, less strong material, typically also a metal, is cast about the inner sleeve 42 and forms the outer element 62. For example, the inner sleeves 42 and 42' may be fabricated of steel which is forged and machined and placed in a die (not illustrated). Then the outer element 62 of an aluminum alloy such as A380 or A390 is die cast about the inner sleeve 42 or 42' and then machined. This approach has the benefit of minimizing the hardness mismatch between the stub shafts 18 and 28 and the inner sleeves 42 and 42'. Alternatively, the inner sleeves 42 and 42' may be cast of an aluminum-silicon carbide metal matrix composite (MMC) and the outer element 62 is cast of the same or similar aluminum alloys noted directly above and then machined. As a further alternative, the inner sleeve 42 may be formed of powdered metal. It will be appreciated that other materials and metals beyond those listed directly above exhibiting the characteristics noted at the beginning of this paragraph are also suitable for use in the present invention.

The description of the invention is merely exemplary in nature and variations that do not depart from the gist of the invention are intended to be within the scope of the invention. Such variations are not to be regarded as a departure from the spirit and scope of the invention.

What is claimed is:

1. A composite clutch hub comprising, in combination,
an inner sleeve fabricated of a first metal, said sleeve having a periphery including a plurality of radial fingers and defining an opening including a plurality of female splines, and
an outer bell fabricated of a second metal of lower strength than said first metal, said outer bell cast in place on said radial fingers of said inner sleeve and having an inner circumferential region of increased thickness proximate and surrounding said radial fingers, a radially extending region of reduced thickness merging with said inner region and a periphery including a plurality of male splines.

2. The composite clutch hub of claim 1 wherein said plurality of female splines engage and couple a pair of axially aligned and juxtaposed shafts each having complementary male splines.

3. The composite clutch hub of claim 1 further including an adjacent clutch having friction plates and wherein said plurality of male splines engage said friction plates of said clutch.

4. The composite clutch hub of claim 1 wherein said first, higher strength metal is steel and said second, lower strength metal is an aluminum alloy.

5. The composite clutch hub of claim 1 wherein said first, higher strength metal is an aluminum alloy metal matrix composite and said second, lower strength metal is a different aluminum alloy.

6. The composite clutch hub of claim 1 wherein said plurality of fingers form a discontinuous flange.

7. The composite clutch hub of claim 1 wherein said outer bell includes a radially oriented portion merging with an axially extending portion.

8. A two component clutch hub comprising, in combination,
an inner component fabricated of a first metal, said inner component defining a through opening including a plurality of female splines and a periphery including a plurality of radial fingers, and
an outer component fabricated of a second metal of lower strength than said first metal, said outer component cast in place on said radial fingers of said inner sleeve and having an inner circumferential region of increased thickness proximate and fully surrounding said radial fingers, a radially extending thinner region merging with said inner region of increased thickness and a periphery merging with said radially extending thinner region and including a plurality of male splines.

9. The two component clutch hub of claim 8 wherein said outer component is cast in place about said periphery of said inner component.

10. The two component clutch hub of claim 8 wherein said first, higher strength metal is steel and said second, lower strength metal is an aluminum alloy.

11. The two component clutch hub of claim 8 wherein said first, higher strength metal is an aluminum alloy metal matrix composite and said second, lower strength metal is a different aluminum alloy.

12. The two component clutch hub of claim 8 wherein said plurality of female splines engage and couple a pair of axially aligned and juxtaposed shafts each having complementary male splines.

13. The two component clutch hub of claim 8 wherein said plurality of male splines engage friction plates of a clutch.

14. A two metal clutch hub comprising, in combination,
an inner sleeve fabricated of a first metal, said sleeve defining an opening including a plurality of female splines and having a periphery including a plurality of radially oriented fingers, and
an outer bell fabricated of a second metal of lower strength than said first metal, said outer bell cast in place on said radial fingers of said inner sleeve and having an inner circumferential region of increased thickness proximate and fully surrounding each of said radially oriented fingers, a radially extending thinner region merging with said inner region of increased thickness and a periphery merging with said radially extending region and including a plurality of male splines.

15. The two metal clutch hub of claim 14 wherein said first, higher strength metal is steel and said second, lower strength metal is an aluminum alloy.

16. The two metal clutch hub of claim 14 wherein said first, higher strength metal is an aluminum alloy metal matrix composite and said second, lower strength metal is a different aluminum alloy.

17. The two metal clutch hub of claim 14 wherein said outer bell is cast in place about said periphery of said inner sleeve.

18. The two metal clutch hub of claim 14 wherein said plurality of female splines engage and couple a pair of axially aligned and juxtaposed shafts each having complementary male splines and said plurality of male splines engage friction plates of a clutch.

* * * * *